US012549913B2

(12) United States Patent
von Mansberg

(10) Patent No.: US 12,549,913 B2
(45) Date of Patent: Feb. 10, 2026

(54) HEARING INSTRUMENT INCLUDING A HOUSING AND AT LEAST ONE ELECTROACOUSTIC INPUT TRANSDUCER

(71) Applicant: Sivantos Pte. Ltd., Singapore (SG)

(72) Inventor: Thilo von Mansberg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 290 days.

(21) Appl. No.: 18/492,959

(22) Filed: Oct. 24, 2023

(65) Prior Publication Data

US 2024/0137717 A1 Apr. 25, 2024
US 2024/0236591 A9 Jul. 11, 2024

(30) Foreign Application Priority Data

Oct. 24, 2022 (DE) .................... 10 2022 211 263.6

(51) Int. Cl.
*H04R 25/00* (2006.01)

(52) U.S. Cl.
CPC ......... *H04R 25/654* (2013.01); *H04R 25/604* (2013.01); *H04R 2225/023* (2013.01)

(58) Field of Classification Search
CPC ................ H04R 25/654; H04R 25/604; H04R 2225/023
USPC .......................................................... 381/325
See application file for complete search history.

(56) References Cited

U.S. PATENT DOCUMENTS 4,706,778 A 11/1987 Topholm
7,003,127 B1 * 2/2006 Sjursen .................. H04R 25/65 381/328
7,245,733 B2 * 7/2007 Saltykov .............. H04R 25/402 381/328
9,084,053 B2 7/2015 Parkins
11,582,565 B2 2/2023 Qi et al.
2001/0043708 A1 * 11/2001 Brimhall .............. H04R 25/656 381/328
2006/0227990 A1 * 10/2006 Kirchhoefer ......... H04R 25/609 381/328

FOREIGN PATENT DOCUMENTS

EP 1439733 A1 7/2004
WO 2014110233 A1 7/2014
WO 2022060039 A1 3/2022

* cited by examiner

*Primary Examiner* — Suhan Ni
(74) *Attorney, Agent, or Firm* — Laurence A. Greenberg; Werner H. Stemer; Ralph E. Locher

(57) ABSTRACT

A hearing instrument includes a housing and at least one electroacoustic input transducer adapted to generate a corresponding electrical input signal from an ambient sound. The housing has a sound entry opening. A sound channel, which guides a sound path from the sound entry opening to the input transducer, is formed inside the housing. A contamination filter, which is transmissive for sound, at least partially covers a first cross section of the sound channel. The sound channel forms a sound chamber between the contamination filter and the sound entry opening, in such a way that the housing partially overlaps the sound chamber in the region of the sound entry opening.

9 Claims, 3 Drawing Sheets

HEARING INSTRUMENT INCLUDING A HOUSING AND AT LEAST ONE ELECTROACOUSTIC INPUT TRANSDUCER

CROSS-REFERENCE TO RELATED APPLICATION

This application claims the priority, under 35 U.S.C. § 119, of German Patent Application DE 10 2022 211 263.6, filed Oct. 24, 2022; the prior application is herewith incorporated by reference in its entirety.

FIELD AND BACKGROUND OF THE INVENTION

The invention relates to a hearing instrument including a housing and at least one electroacoustic input transducer, wherein the input transducer is adapted to generate a corresponding electrical input signal from an ambient sound, the housing has a sound entry opening, and a sound channel, which guides a sound path from the sound entry opening to the input transducer, is formed inside the housing.

Hearing instruments with microphones, which are thus adapted for capturing sound signals of the environment and for corresponding postprocessing and optionally reproduction, conventionally have a sound entry opening in the housing in the region of the respective microphone, so that the sound signal of the environment can propagate to the microphone. The sound entry opening is often protected against external influences, and particularly against dirt, by a contamination filter. Since a hearing instrument is conventionally worn on the ear, contamination may also occur due to skin particles, hairs, and possibly sweat, etc. The sound entry openings are usually very small in their dimensions (diameter on the order of 1 mm, albeit depending on the specific construction) and correspondingly difficult to clean.

However, proper functioning of a microphone may be impaired by an excess of contamination, for which reason the contamination filter needs to be cleaned regularly. While relatively coarse cleaning of the contamination filter may still be carried out by the wearer themself or herself using a small brush or the like, in that case, however, the contamination often cannot be removed from the contamination filter to a sufficient extent because of the arrangement of the contamination filter in the sound entry opening. The contamination filter often includes a type of fabric which has openings on the order of about 20 μm in size. Such small openings can no longer be cleaned reliably by the users themselves using a brush, a paintbrush or the like.

U.S. Pat. No. 11,582,565 B2 discloses a loudspeaker arrangement, which may include a microphone in order to implement the functions of a hearing aid. The microphone may be disposed in a housing of the loudspeaker arrangement in such a way that a sound channel is guided from a sound entry opening into the housing while forming a bend. A waterproof textile mesh may be fitted directly in front of the microphone in the housing.

International Publication WO 2014/110233 A1, corresponding to U.S. Pat. Nos. 9,084,053 and 9,609,411, relates to a microphone arrangement in which a microphone is disposed in a housing, wherein a sound channel can be guided from a sound entry opening to the microphone along the housing. The sound entry opening may be coated with a screen.

SUMMARY OF THE INVENTION

It is accordingly an object of the invention to provide a hearing instrument including a housing and at least one microphone, or in general an electroacoustic input transducer, which overcomes the hereinafore-mentioned disadvantages of the heretofore-known instruments of this general type and which can be cleaned as easily and thoroughly as possible by the wearers of the hearing instrument themselves.

With the foregoing and other objects in view there is provided, in accordance with the invention, a hearing instrument, comprising a housing and at least one electroacoustic input transducer, wherein the input transducer is adapted to generate a corresponding electrical input signal from an ambient sound, the housing has a sound entry opening, a sound channel, which guides a sound path from the sound entry opening to the input transducer, is formed inside the housing, a contamination filter, which is transmissive for sound, at least partially covers a first cross section of the sound channel, and the sound channel forms a sound chamber between the contamination filter and the sound entry opening, in such a way that the housing partially overlaps the sound chamber in the region of the sound entry opening. In this case, the housing extends on its inner side substantially parallel to the contamination filter in an overlap region of the sound chamber, which is defined by the region in which the sound chamber is overlapped by the housing. The hearing instrument is distinguished in that, in the overlap region of the sound chamber, the contamination filter has a distance of at least 0.05 mm and at most 1 mm from the inner side of the housing. The dependent claims and the following description relate to advantageous configurations, some of which are inventive per se.

A hearing instrument generally means any apparatus which is adapted to generate a sound signal from an electrical signal—which may be provided by an internal signal of the apparatus—and deliver it to an auditory system of a wearer of this apparatus, that is to say in particular an earplug, a headset, smartglasses with a loudspeaker, etc. The hearing instrument in this case includes at least one electroacoustic input transducer, so that the internal signal of the apparatus may in particular be formed by postprocessing of the electrical input signal that is generated by the input transducer. A hearing instrument also means in particular a hearing aid in the narrower sense, that is to say a device for alleviating a hearing impairment of the wearer, in which the input signal generated from the ambient sound by using the input transducer is processed to form an output signal, while in particular being amplified frequency-band dependently, and an output sound signal generated from the output signal by using a loudspeaker or the like (more generally, by using an electroacoustic output transducer) is suitable to at least partially compensate user-specifically for the hearing impairment of the wearer.

An electroacoustic input transducer means in particular any apparatus which is adapted to generate a corresponding electrical signal from an ambient sound, the air pressure variations (due to the sound waves) being converted into corresponding voltage and/or current variations. In particular, an electroacoustic input transducer means a microphone.

The at least one electroacoustic input transducer is in this case disposed inside the housing of the hearing instrument. The hearing instrument is preferably to be worn in or on an ear for intended operation by the wearer, in which case a part of the housing may be intended to be worn behind the pinna in the form of a so-called ear hook (for instance in the case of a so-called behind-the-ear hearing aid). The hearing instrument may in particular be part of a hearing system, for instance as a local hearing aid of a binaural hearing aid system, or as a headset system, which may optionally be controlled by using a smartphone or smartwatch, or the like.

A sound entry opening of the housing means in particular any opening in the housing of the hearing instrument which is intended as well as adapted to allow propagation of the ambient sound into the interior of the housing to at least one input transducer. The propagation then takes place along the sound channel, which is then by definition provided as a corresponding sound path of the ambient sound from the sound entry opening to the input transducer. The sound channel may in this case be formed by corresponding conducting elements that carry the sound, which are formed on the housing or mechanically connected thereto. The sound channel may, however, also be formed without dedicated guide elements by intermediate spaces between individual elements inside the hearing instrument, for instance electronic elements (for instance a preamplifier, a printed circuit board, a signal processor unit, etc.), elements of a power supply (for example a battery unit with associated voltage converters, etc.), mounts, mechanical damping elements, etc.

A contamination filter, which is transmissive for sound and preferably includes a fabric and/or a textile, is disposed in the sound channel between the sound entry opening and the input transducer in such a way that a first cross section of the sound channel is at least partially covered at the location of the contamination filter. The first cross section need not be considered perpendicularly to a flow direction and/or a propagation direction of the sound in the sound channel, but may also be inclined relative to one of the directions.

The first cross section is in particular defined as the greatest dimension (along the contamination filter) of the region covered by the contamination filter and/or as the greatest dimension of the sound channel (along the contamination filter and/or along the sound channel) in the region covered by the contamination filter.

The contamination filter may in this case cover the sound channel, in particular fully, that is to say a mount or a frame apparatus of the contamination filter bears flush on the walls of the sound channel (or is for instance embedded into a circumferential groove in the sound channel, or the like). The contamination filter may nevertheless, in particular, also cover only a part of the sound channel. Preferably, however, in the sound chamber, the contamination filter covers at least a projection of the sound entry opening in the direction of the sound chamber, that is to say the contamination filter covers at least the region of the sound channel which, as a projection of the sound entry opening (in the projection direction of the sound channel and/or perpendicularly to a plane formed by the sound entry opening or by the contour of the housing existing there), is directly exposed to the ingress of contamination through the sound entry opening.

The contamination filter is preferably disposed in the sound channel in the vicinity of the sound exit opening, so that contamination which enters into the sound channel through the sound entry opening and is retained at the contamination filter can at least partially be removed through the sound entry opening by corresponding cleaning of the contamination filter. Preferably, the distance between the sound entry opening and the contamination filter is at least 0.2 mm, particularly preferably at least 0.3 mm and at most 1.5 mm, particularly preferably at most 0.8 mm.

A sound chamber, which preferably generates an additional intermediate space around the contamination filter, is now formed in the sound channel, at least in the region between the contamination filter and the sound entry opening. The housing in this case overlaps the sound chamber in the region of the sound entry opening, that is to say the sound chamber is at least partially formed behind the housing wall at the sound entry opening. In other words, this means in particular that the sound channel increases its cross section from the sound entry opening in the housing toward the input transducer, so that the sound chamber is thereby formed, which is then partially overlapped by the housing (except for the edge of the housing formed by the sound entry opening). Preferably, the contamination filter is disposed in the sound chamber.

The effect achieved by the described arrangement is that contaminating particles which enter into the sound channel through the sound entry opening do not significantly obstruct the sound channel itself after incomplete cleaning of the contamination filter due to the enlargement of the sound channel to the sound chamber in the region of the contamination filter. The contaminating particles are almost fully trapped by the region of the contamination filter which lies in the sound channel in the projection of the sound entry opening. In the region of the contamination filter, however, the sound chamber is formed in the sound channel so that the cross section of the sound channel is increased in this case at least in one direction. The contaminating particles, however, are no longer deposited on the contamination filter in the overlap region of the sound chamber (which is defined by the region that is overlapped by the housing); in this overlap region of the sound chamber, the contamination filter remains substantially free of contamination. Even if not all the contaminating particles can be fully removed during cleaning of the contamination filter through the sound entry opening (for example with a paintbrush or a brush, see above) the sound path from the sound entry opening to the input transducer is therefore now enabled via the enlargement of the sound channel in the region of the contamination filter, provided in the form of the sound chamber. The propagation of the sound in case of uncertainty (in the event of insufficient cleaning of the contaminated region of the contamination filter in the region of the aforementioned projection) may take place via the overlap region of the sound chamber in a kind of "bypass."

Expediently, the contamination filter fully covers the sound chamber at the first cross section. In particular, this means that also in the overlap region of the sound chamber (which thus forms the aforementioned bypass) the contamination filter fully covers the sound chamber. In particular, this can prevent contaminating particles from being pushed into the sound chamber toward the input transducer and obstructing the latter in the case of cleaning by a paintbrush.

Favorably, the contamination filter includes a fabric and/or a textile, particularly in the region of the projection of the sound entry opening. In particular, the fabric or textile has openings with a size of between 1 μm and 100 μm, preferably between 5 μm and 50 μm, particularly preferably between 10 μm and 30 μm. By a contamination filter configured in such a way, the contaminating particles which usually occur can be kept away from the input transducer, except for residues that are no longer relevant.

Preferably, in the region of the sound entry opening, the housing has an indentation into a contour of the housing, which merges into the sound entry opening. In particular, this means that the contour of the housing has a kind of notch, recess or similar depression in the region of the sound entry opening, which preferably does not fully enclose the sound entry opening but has a preferential direction. The indentation may facilitate the access of a corresponding paintbrush, or the like, to the contamination filter during cleaning. Since the indentation extends only along a preferential direction, for this purpose a thinner configuration of the housing is only necessary in this region, so that the stability of the housing in the region of the sound entry opening is not significantly reduced by the indentation.

Advantageously, when the hearing instrument is worn as intended (and in the case of a standing or sitting wearer), the overlap region of the sound chamber, which is defined by the region in which the sound chamber is overlapped by the housing, lies at least partially higher than the sound entry opening so that a sound path is thereby guided upward (that is to say in the cranial direction) from the sound entry opening into the sound chamber. This means that contaminating particles which accumulate in the contamination filter are also thereby kept by the force of gravity in the projection of the sound entry opening, so that the aforementioned bypass via the overlap region of the sound chamber continues to remain sufficiently free for the sound propagation.

According to the invention, in the overlap region of the sound chamber, the housing extends on its inner side substantially parallel to the contamination filter. In this way, refraction effects can be avoided for the ambient sound guided through the sound chamber, and in particular through its overlap region, which might otherwise lead to undesired resonances.

In this case, in the overlap region of the sound chamber, the contamination filter has a distance of at least 0.05 mm and preferably at least 0.1 mm, and at most 1 mm and preferably at most 0.5 mm from the inner side of the housing. These dimensions use the space conventionally available in a hearing instrument particularly compactly in order to allow propagation of the sound.

Preferably, an effective cross section of the sound chamber, which is defined by the longest dimension along the contamination filter, is at least 50%, preferably at least 80%, particularly preferably at least 100% larger than the largest cross section of the sound entry opening. The sound channel therefore becomes larger in the sound chamber along the contamination filter by at least 50%, or at least 80%, or at least 100%. In this way, propagation of the ambient sound may be ensured in the case of a contaminated (still residually contaminated after cleaning) contamination filter by using the available space.

Preferably, the hearing instrument is embodied as a hearing aid, which is intended and adapted to alleviate a hearing impairment of the wearer. For this purpose, the hearing aid has in particular a signal processing unit which is adapted to process the electrical input signal generated by the electroacoustic input transducer (and possibly by one or more further such input transducers) according to the audiological requirements of the wearer of the hearing aid, so that an output signal is therefore generated which is thereby matched individually to a hearing reduction or a general hearing impairment of the wearer. For such a hearing aid, operation with the least possible interference of the respective input transducer for the alleviation of the hearing impairment of the wearer is of particular importance, for which reason a hearing aid also benefits significantly from the arrangement, according to the invention, of the contamination filter.

Other features which are considered as characteristic for the invention are set forth in the appended claims.

Although the invention is illustrated and described herein as embodied in a hearing instrument including a housing and at least one electroacoustic input transducer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
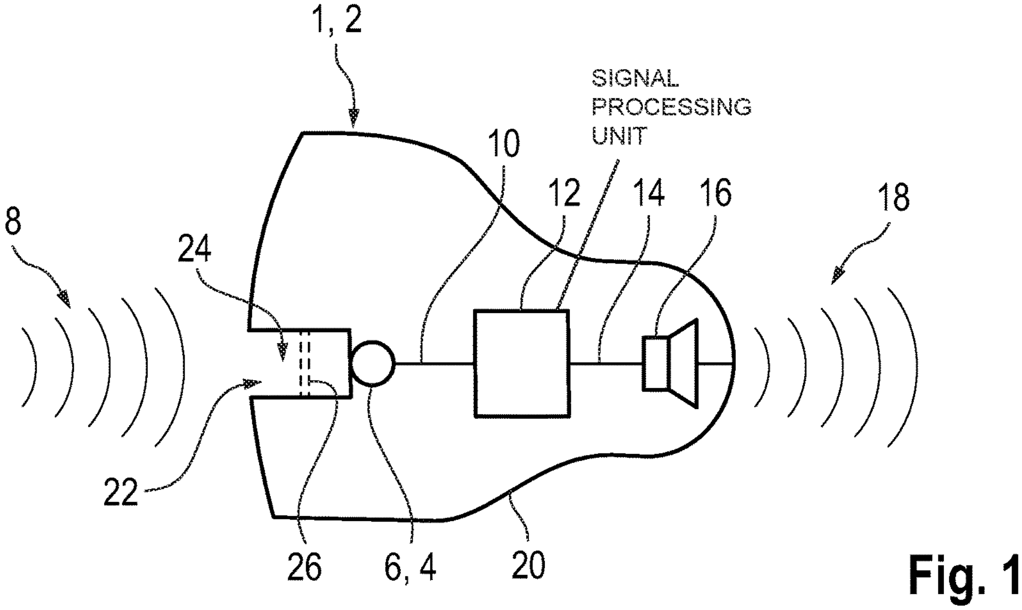
FIG. 1 is a block diagram of a hearing aid having a contamination filter for protecting the microphone.

Referring now in detail to the figures of the drawings, in which parts and sizes that correspond to one another are always provided with the same reference signs, and first, particularly, to FIG. 1 thereof, there is seen a block diagram of a hearing instrument 1, which in the present case is embodied as a hearing aid 2. The hearing aid 2 shown in FIG. 1 is configured as a so-called ITE (in-the-ear) hearing aid, although another configuration (BTE, CIC, RIC, etc.) may also be envisioned. The hearing aid 2 is intended and adapted to alleviate a hearing impairment of a wearer (not shown in detail in FIG. 1) while at least partially compensating therefor. For this purpose, the hearing aid 2 includes an electroacoustic input transducer 4, which in the present case is configured as a microphone 6 and is adapted to generate an electrical input signal 10 from an ambient sound 8. The voltage variations of the input signal 10 in this case reproduce the variations in the air pressure which are due to the ambient sound 8.

The input signal 10 is processed in a signal processing unit 12 according to the audiological requirements of the wearer, while in particular being amplified and/or compressed according to the frequency band. The signal processing unit 12 thereby generates an electrical output signal 14, which is converted by an electroacoustic output transducer 16 of the hearing aid 2, in the present case embodied as a loudspeaker, into an output sound signal 18. During intended operation, the hearing aid 2 is worn by the wearer on an ear in such a way that the output sound signal 18 is conveyed into the corresponding auditory canal (not represented) and propagates there to the eardrum. The hearing aid 2 may optionally also have a further electroacoustic input transducer (not represented), so that by using an additional electrical input signal (generated by the latter) and the input signal 10, directional signal processing (for instance by using directional microphonics) may also be carried out in the signal processing unit 12.

The hearing aid 2 furthermore has a housing 20, inside which the microphone 6 (and optionally the further input transducer), the signal processing unit 12 and the output transducer 16 are disposed. In the housing 20, a sound entry opening 22, through which the ambient sound 8 can enter into the housing 20, and correspondingly propagate along a sound channel 24 to the microphone 6, is introduced in the vicinity of the microphone 6. In the sound channel 24, a contamination filter 26, which is adapted to safeguard the microphone 6 from ingress of contamination, and to prevent obstruction of the sound channel 22, is disposed between the microphone 6 and the sound entry opening 22, in the vicinity of the latter.

Figure 2:
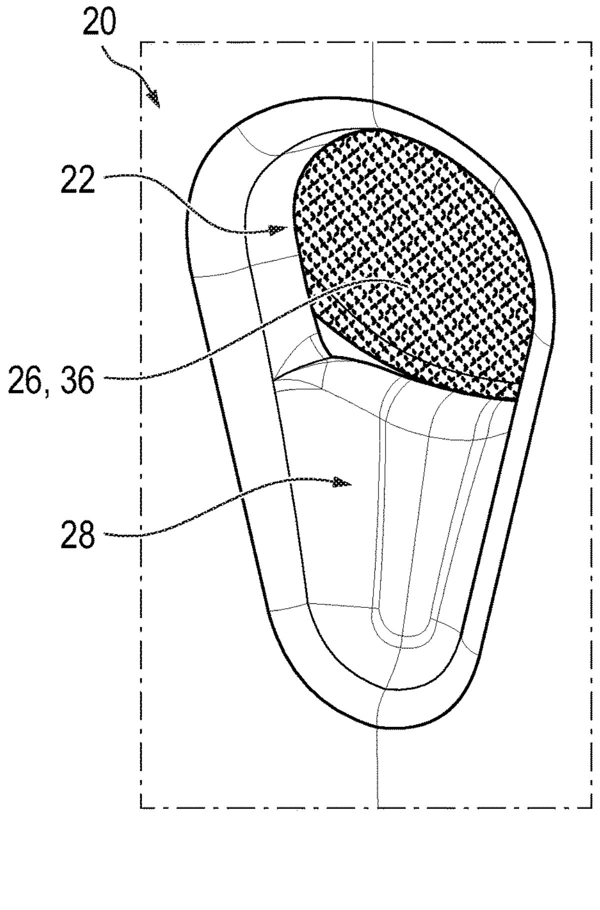
FIG. 2 is a perspective view of a housing of the hearing aid according to FIG. 1 in the region of a sound entry opening.

The precise arrangement of the contamination filter 26 in the sound channel is shown in FIG. 2. FIG. 2 shows an oblique view of the housing 20 of the hearing aid 2 according to FIG. 1 in the region of the sound entry opening 22. In this case, an indentation 28 of the housing 20 at the sound entry opening 22 can be seen, which extends only in one direction 29 and merges into the latter. This indentation 28 facilitates the cleaning of a fine fabric 36 of the contamination filter 26 by using a paintbrush or a brush.

Figure 3A:
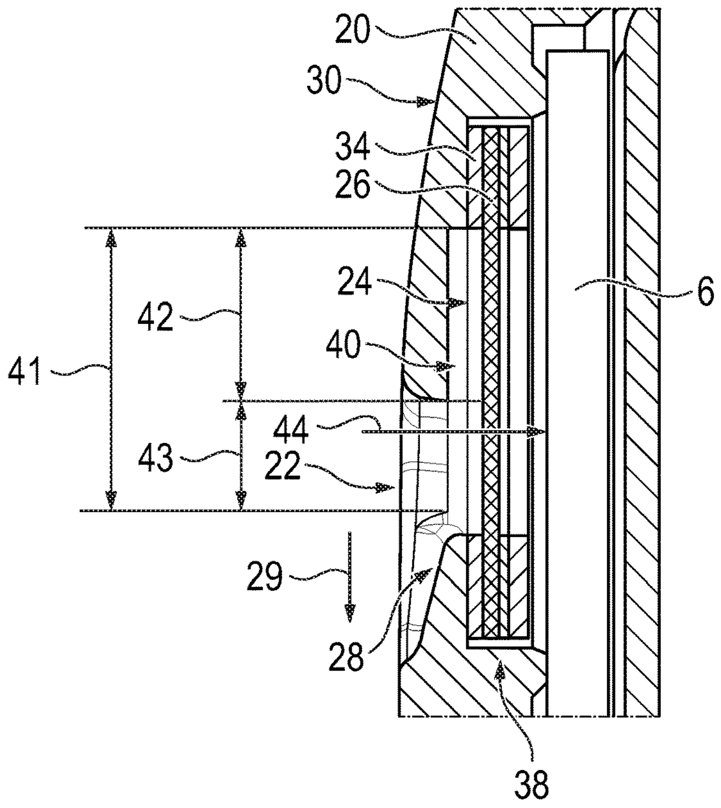
FIGS. 3*a*-3*d* are longitudinal-sectional views of the region shown in FIG. 2 as well as the sound chamber formed behind the latter for different contaminations of the contamination filter.

FIGS. 3*a* to 3*d* show respective longitudinal sectional representations of the region of the housing 20 shown in FIG. 2 with the adjacent sound channel 24. In FIG. 3*a*, it can be seen that toward the microphone 6 in the region of the contamination filter 26, the sound channel 24 forms a sound chamber 40 which is overlapped in an overlap region 42 by the housing 20 (adjacent to the sound entry opening 22 and above the latter when worn as intended). As can furthermore be seen, the indentation 28 forms a depression in the contour or shape 30 of the housing 20 in the direction 29 according to FIG. 2. In the present example, the contamination filter 26 additionally also has a frame 34 which is disposed in a groove 38 in the housing 20 and positions the fabric 36 in the sound chamber 40. In FIG. 3*a*, the contamination filter 26 has no contamination whatsoever and a sound path 44 from the sound entry opening 22 to the microphone 6 is thus possible without hindrance. It can furthermore be seen that the entire sound chamber 40 has a first cross section 41 covered by the fabric 36 of the contamination filter 26, which cross section in the present case is more than two times as large as a cross section 43 of the sound entry opening 22.

Figure 3B:
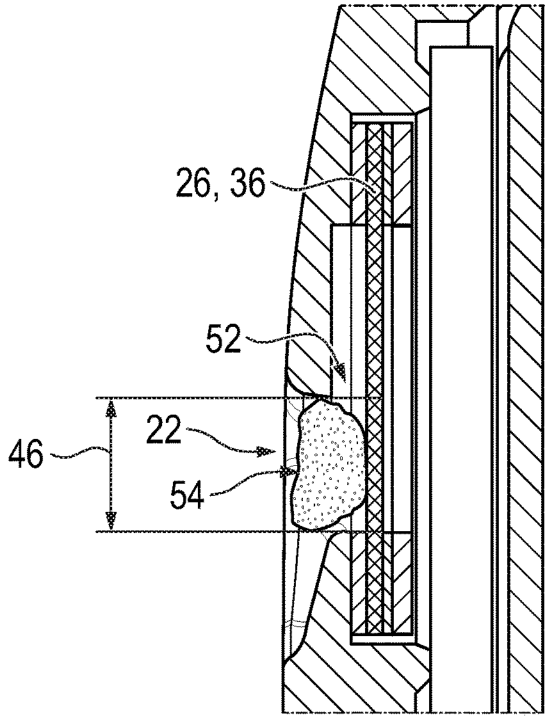

In FIG. 3*b*, the contamination filter 26 (or the fabric 36) is now significantly contaminated by contaminating particles in the region of a projection 46 of the sound entry opening 22 onto the contamination filter 26 and obstruction of the sound path 44 occurs. In an overlap region 42 of the sound chamber 40, which is defined by the region of the sound chamber 40 that is overlapped by the housing 20, there is however no significant contamination of the contamination filter 26 (since, for this, corresponding contaminating particles would have to penetrate through a gap 52 between the fabric 36 and the housing 20, which is prevented by the contamination 54 itself building up).

Figure 3C:
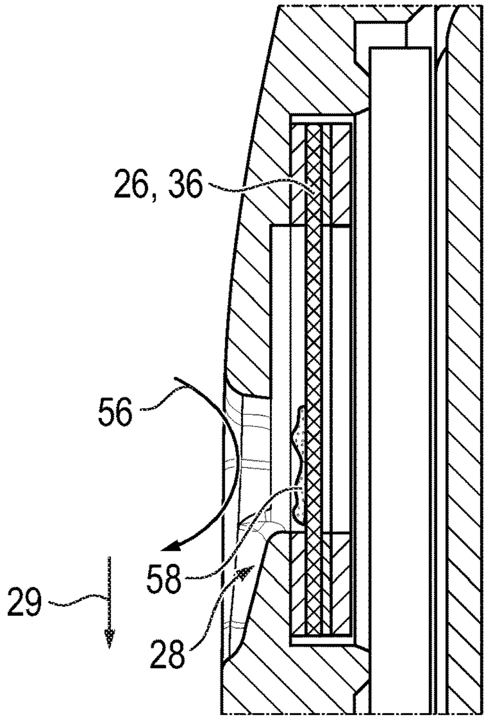

In FIG. 3*c*, a cleaning movement 56 for a paintbrush or the like is indicated (double arrow), by which the contamination 54 of FIG. 3*b* is removed from the fabric 36. The cleaning movement 56 extends in the direction 29, while using the indentation 28 in the housing 20 so that the paintbrush being used can reach the fabric 36 more easily. After the cleaning, however, residual contamination 58 still remains on the fabric 36 of the contamination filter 26, but only in the region of the projection 46 of the sound entry opening 22 onto the contamination filter 26 (since, as described, the contamination 54 does not encroach into the overlap region 42 of the sound chamber 40).

Figure 3D:
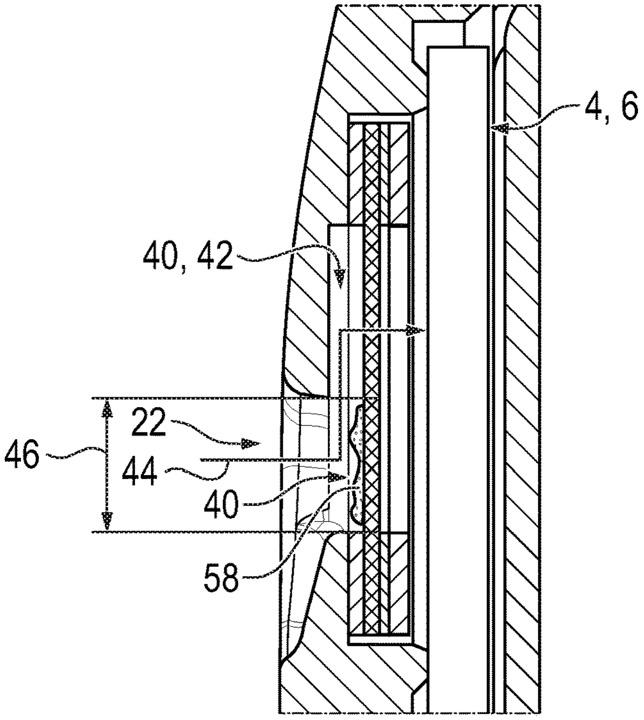

FIG. 3*d* shows the sound path 44 which now arises the sound channel 24 potentially due to the residual contamination 58. If the residual contamination 58 on the contamination filter 26 prevents the ambient sound 8, which enters through the sound entry opening 22 into the hearing aid 2, from propagating toward the microphone 6 in the region of the projection 46 of the sound entry opening 22, propagation is still possible through the contamination-free part of the contamination filter 26 in the overlap region 42 of the sound chamber 40. In this case, it is advantageous for the overlap region 42 to be disposed substantially higher than the sound entry opening 22 when worn as intended (and for a standing or sitting wearer), so that the force of gravity 60 keeps the contamination 54 in the region of the projection 46 of the sound entry opening 22 and it does not penetrate into the overlap region 42 of the sound chamber 40.

Although the invention has been illustrated and described in detail by the preferred exemplary embodiment, the invention is not restricted to the examples disclosed and other variations may be derived therefrom by a person skilled in the art without departing from the protected scope of the invention.

The following is a summary list of reference numerals and the corresponding structure used in the above description of the invention.

LIST OF REFERENCE SIGNS

1 hearing instrument
2 hearing aid
4 (electroacoustic) input transducer
6 microphone
8 ambient sound
10 (electrical) input signal
12 signal processing unit
14 (electrical) output signal
16 (electroacoustic) output transducer
18 output sound signal
20 housing
22 sound entry opening
24 sound channel
26 contamination filter
28 indentation
29 direction
30 contour (of the housing)
34 frame
36 fabric
38 groove
40 sound chamber
41 first cross section (of the sound chamber)
42 overlap region
43 cross section (of the sound entry opening)
44 sound path
46 projection (of the sound entry opening)
52 gap
54 contamination
56 cleaning movement
58 residual contamination
60 force of gravity

The invention claimed is:

1. A hearing instrument, comprising:

a housing having a sound entry opening;

at least one electroacoustic input transducer adapted to generate a corresponding electrical input signal from an ambient sound;

a sound channel formed inside said housing, said sound channel guiding a sound path from said sound entry opening to said input transducer, and said sound channel having a first cross section;

a contamination filter being transmissive for sound, said contamination filter at least partially covering said first cross section of said sound channel;

said sound channel forming a sound chamber between said contamination filter and said sound entry opening, said sound chamber being partially overlapped by said housing defining an overlap region in a vicinity of said sound entry opening;

said housing having an inner side extending substantially parallel to said contamination filter in said overlap region of said sound chamber; and said contamination filter being disposed at a distance of at least 0.05 mm and at most 1 mm from said inner side of said housing in said overlap region of said sound chamber.

2. The hearing instrument according to claim 1, wherein said sound entry opening has a projection in a direction of said sound chamber, and said contamination filter covers at least said projection in said sound chamber.

3. The hearing instrument according to claim 2, wherein said contamination filter fully covers said sound chamber at said first cross section.

4. The hearing instrument according to claim 2, wherein said contamination filter includes at least one of a fabric or a textile.

5. The hearing instrument according to claim 4, wherein said at least one of a fabric or a textile is disposed in a region of said projection of said sound entry opening.

6. The hearing instrument according to claim 1, wherein, in a region of said sound entry opening, said housing has a contour and an indentation into said contour merging into said sound entry opening.

7. The hearing instrument according to claim 1, wherein said overlap region of said sound chamber lies at least partially higher than said sound entry opening when the hearing instrument is worn as intended, and said sound path is thereby guided upward from said sound entry opening into said sound chamber.

8. The hearing instrument according to claim 1, wherein an effective cross section of said sound chamber defined by a longest dimension along said contamination filter, is at least 50% larger than a largest cross section of said sound entry opening.

9. The hearing instrument according to claim 1, wherein the hearing instrument is a hearing aid intended and adapted to alleviate a hearing impairment of a wearer.

* * * * *